United States Patent
Leone et al.

(10) Patent No.: US 9,316,172 B2
(45) Date of Patent: Apr. 19, 2016

(54) REDUCING ENRICHMENT DUE TO MINIMUM PULSE WIDTH CONSTRAINT

(71) Applicant: Ford Global Technologies, LLC, Dearborn, MI (US)

(72) Inventors: Thomas G. Leone, Ypsilanti, MI (US); William Charles Ruona, Farmington Hills, MI (US); Todd Anthony Rumpsa, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 388 days.

(21) Appl. No.: 13/857,895

(22) Filed: Apr. 5, 2013

(65) Prior Publication Data

US 2014/0303878 A1    Oct. 9, 2014

(51) Int. Cl.
| | | |
|---|---|---|
| F02D 43/00 | (2006.01) | |
| F02D 41/18 | (2006.01) | |
| F02D 37/00 | (2006.01) | |
| F02D 41/00 | (2006.01) | |
| F02B 37/18 | (2006.01) | |

(52) U.S. Cl.
CPC ............. *F02D 43/00* (2013.01); *F02B 37/18* (2013.01); *F02D 37/00* (2013.01); *F02D 41/0002* (2013.01); *F02D 41/182* (2013.01); *F02D 2041/001* (2013.01); *F02D 2200/0602* (2013.01); *F02D 2250/18* (2013.01); *F02D 2700/02* (2013.01); *Y02T 10/144* (2013.01); *Y02T 10/42* (2013.01)

(58) Field of Classification Search
CPC ........... F02D 9/00; F02D 13/00; F02D 41/30; F02D 31/005; F02D 41/08; F02D 19/02; F02D 37/02; F02D 41/0002; F02D 43/00; F02D 37/00; F02D 2041/001; F02D 2250/18; F02D 41/182; F02D 2200/0602; F02D 2700/02; F02P 5/045; F02P 5/1502; F02P 5/1516; F02B 37/18; Y02T 10/144; Y02T 10/42
USPC .......... 123/339.12, 344, 406.47, 704, 406.44, 123/406.45, 672, 703, 568.11, 568.15
See application file for complete search history.

(56) References Cited

U.S. PATENT DOCUMENTS

| | | | | |
|---|---|---|---|---|
| 3,738,341 | A * | 6/1973 | Loos | 123/682 |
| 6,273,060 | B1 * | 8/2001 | Cullen | 123/325 |
| 2005/0263146 | A1 * | 12/2005 | Oono | F02D 41/222 123/690 |
| 2008/0064567 | A1 * | 3/2008 | Kue et al. | 477/109 |
| 2010/0071658 | A1 * | 3/2010 | Soejima et al. | 123/406.19 |
| 2011/0053735 | A1 * | 3/2011 | Lewis et al. | 477/99 |
| 2011/0270511 | A1 | 11/2011 | Kurtz | |
| 2012/0010792 | A1 * | 1/2012 | Nedorezov et al. | 701/54 |
| 2012/0145122 | A1 | 6/2012 | Kurtz et al. | |

* cited by examiner

*Primary Examiner* — Hung Q Nguyen
*Assistant Examiner* — Brian P Monahon
(74) *Attorney, Agent, or Firm* — Julia Voutyras; Alleman Hall McCoy Russell & Tuttle LLP (57) ABSTRACT

Methods and systems are provided for maintaining stoichiometry of an exhaust gas during operation of a fuel injector at a threshold pulse width. In response to operation of a fuel injector at the threshold pulse width and a rich exhaust gas air-fuel ratio, airflow is increased to the intake manifold. Engine actuators may also be adjusted to maintain torque during the increased airflow while operating the fuel injectors at the threshold pulse width.

18 Claims, 5 Drawing Sheets

REDUCING ENRICHMENT DUE TO MINIMUM PULSE WIDTH CONSTRAINT

BACKGROUND/SUMMARY

Engines may be configured with direct fuel injectors that inject fuel directly into a combustion cylinder (direct injection), and/or with port fuel injectors that inject fuel into an intake port (port fuel injection). The fuel injectors may operate over a range of pulse widths with the amount of fuel injected into the cylinders decreasing with decreasing pulse width. Further, the fuel injectors may have a threshold (e.g., lower threshold) pulse width at which the pulse width and amount of fuel injected may not be further reduced. Under certain operating conditions, when engine airflow is lower and/or fuel pressure in the fuel system is higher, operation of the fuel injectors at the threshold pulse width may result in a rich air-fuel ratio of an exhaust gas. The rich exhaust gas air-fuel ratio may result in reduced exhaust aftertreatment efficiency and increased exhaust emissions.

One example approach for addressing fuel injector operation at a threshold pulse width is shown by Cullen et al. in U.S. Pat. No. 6,273,060. Therein, engine airflow is controlled to maintain an exhaust air-fuel ratio at stoichiometry when fuel injector operation limits are reached. These limits include operation of the fuel injectors at a minimum, or threshold, pulse width. When the fuel injectors are not being operated at the threshold pulse width, engine airflow may be controlled to provide a desired engine torque.

However, the inventors herein have recognized potential issues with such methods. For example, while adjusting airflow to maintain stoichiometry during fuel injector operation at the threshold pulse width may decrease exhaust emissions, engine torque output may not be maintained at a requested level. In some examples, increasing engine airflow to maintain stoichiometry may include increasing airflow to a higher level than required by a torque demand. As such, engine torque output may be greater than requested by the vehicle operator.

In one example, the issues described above may be addressed by a method for adjusting engine airflow and engine actuators in response to fuel injector operation. Specifically, during operation of a fuel injector at a threshold pulse width, engine airflow may be increased to maintain an exhaust gas mixture near stoichiometry while adjusting an engine actuator to maintain torque. In this way, exhaust emissions may be reduced while maintaining requested engine performance.

As one example, an engine controller may increase engine airflow, during operation of a fuel injector at a threshold pulse width, to maintain an exhaust gas mixture at stoichiometry. Specifically, in response to operation of a fuel injector at the threshold pulse width, when an air-fuel ratio of an exhaust gas is less than a stoichiometric ratio, the controller may increase engine airflow greater than requested by a vehicle operator, without increasing engine torque by adjusting an engine actuator to maintain torque. Increasing engine airflow may include increasing an opening of an intake throttle, wherein the amount of opening may be based on the air-fuel ratio of the exhaust gas. In one example, the controller may increase an amount of a spark retard to compensate for the increased engine airflow, thereby maintain engine torque at a requested level. Additional or alternative engine actuator adjustments may be made to maintain torque, including adjusting alternator loading, a variable valve timing, a variable valve lift, and/or an opening of a wastegate.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for maintaining an exhaust gas mixture near stoichiometry during operation of a fuel injector at a threshold pulse width. An engine system, such as the engine system shown in FIG. 1, may include a fuel system, as shown in FIG. 2, with one or more fuel injectors for injecting fuel into one or more engine cylinders for combustion. Under certain conditions, operating the fuel injectors at a threshold, or minimum, pulse width may result in a rich air-fuel ratio. By increasing engine airflow during the threshold pulse width operation, the air-fuel ratio may be maintained at a stoichiometric level, thereby increasing exhaust aftertreatment efficiency and reducing exhaust emissions. A method for adjusting engine airflow based on fuel injector operation and an exhaust air-fuel ratio is presented at FIG. 3. This method for increasing engine airflow may include increasing engine airflow to a level higher than required by a requested torque demand. Thus, an engine controller may adjust additional engine actuators to reduce total torque and maintain engine torque output at the requested level. FIG. 4 shows a method for adjusting engine actuators to maintain torque while increasing engine airflow during operation of a fuel injector at a threshold pulse width. Example engine actuator adjustments are presented at FIG. 5.

Figure 1:
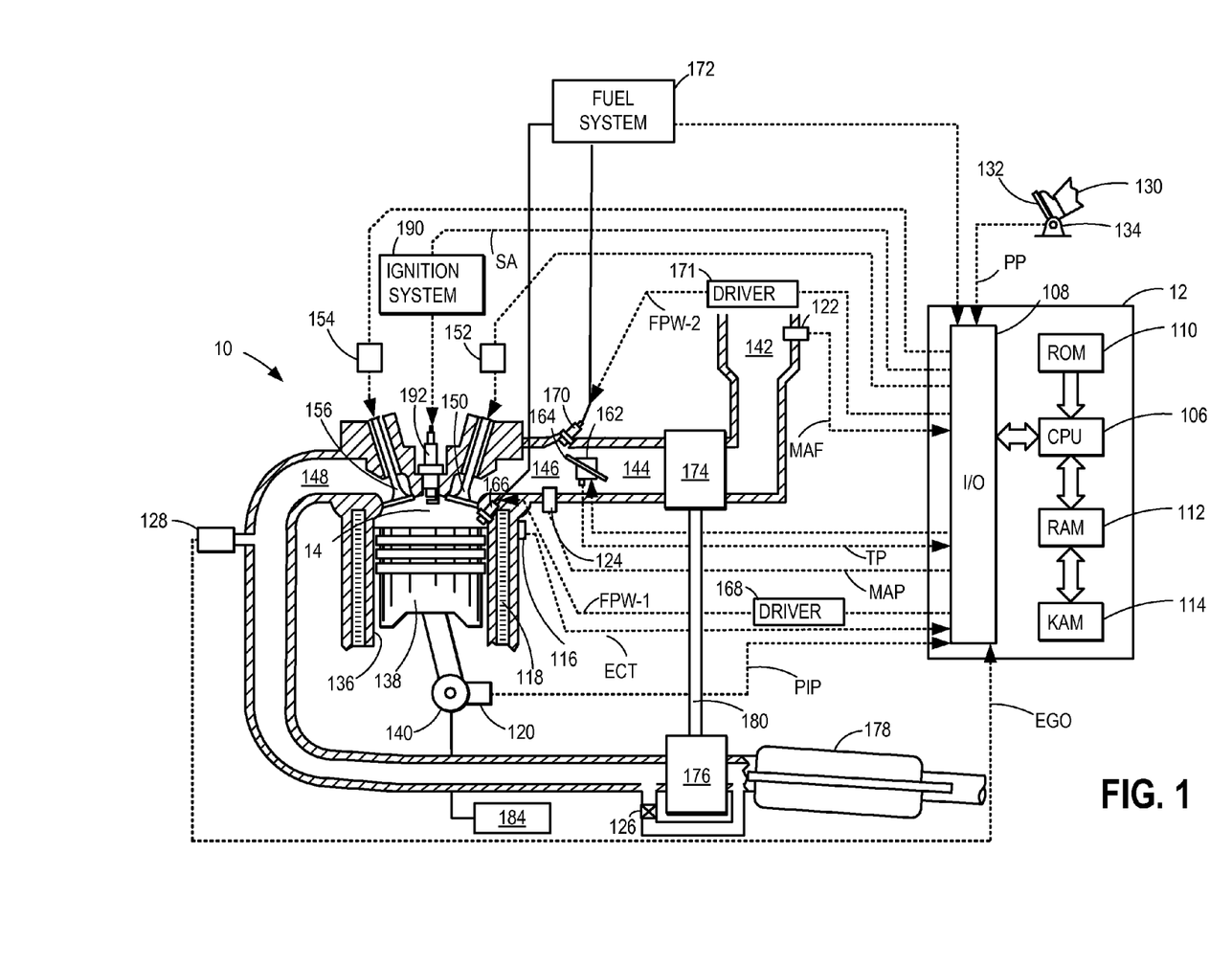
FIG. 1 shows a schematic diagram of an example engine system.
Figure 2:
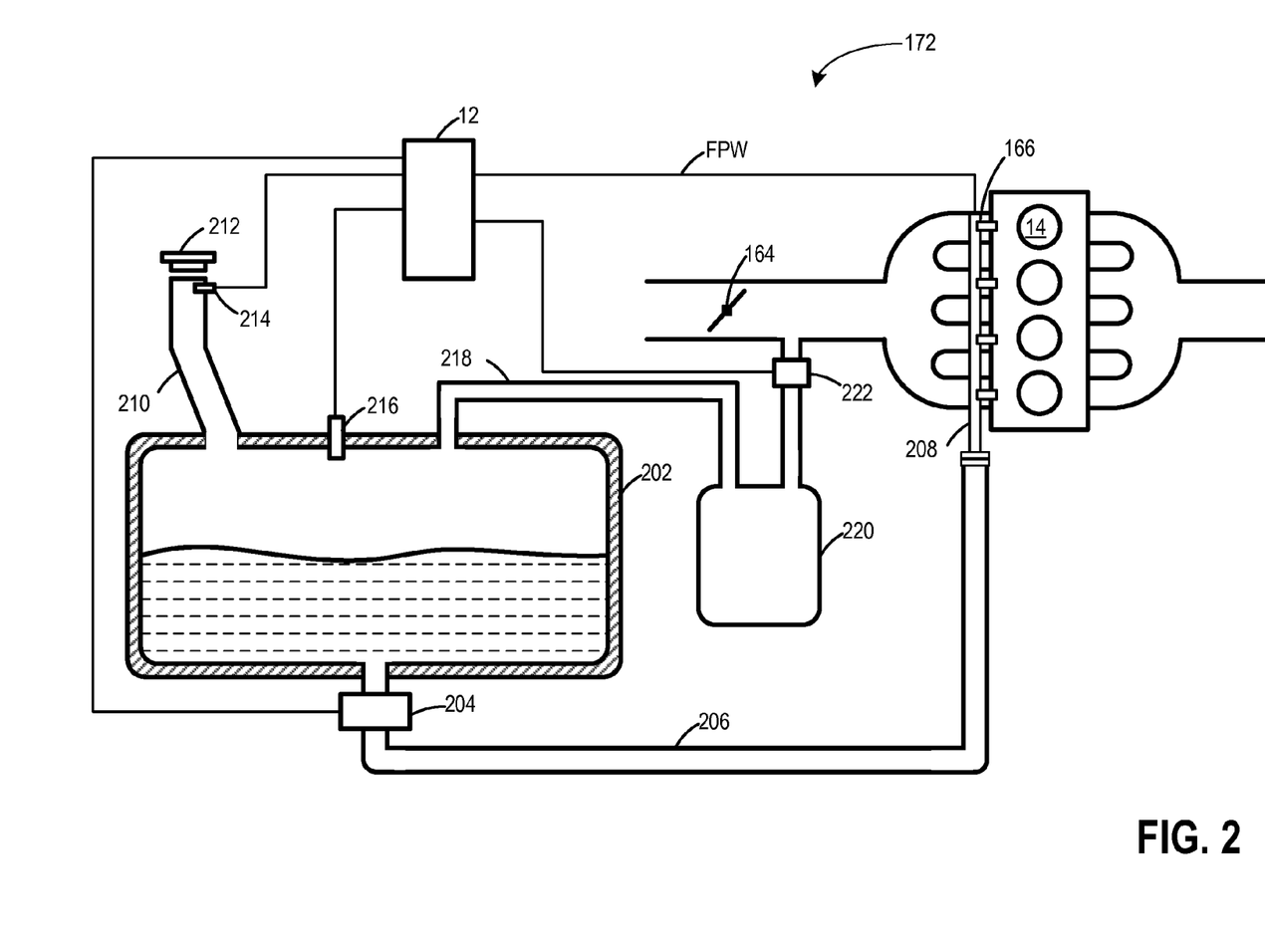
FIG. 2 shows a schematic diagram of a fuel system of an engine.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10. Further still, crankshaft 140 may be used to drive alternator 184.

Cylinder 14 may receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174. Adjusting a position of the throttle plate 164 may increase or decrease the opening of the throttle 162, thereby changing mass air flow, or the flow rate of intake air entering the engine cylinders. For example, by increasing the opening of the throttle 162, mass air flow may increase. Conversely, by decreasing the opening of the throttle 162, mass air flow may decrease. In this way, adjusting the throttle 162 may adjust the amount of air entering the cylinder 14 for combustion. For example, by increase mass air flow, torque output of the engine may increase. Further details on adjusting the throttle to increase mass air flow during certain engine operating conditions are presented below at FIGS. 3-4.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air-fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. The controller 12 may adjust engine actuators in order to maintain the exhaust gas mixture at sensor 128 near stoichiometry. A stoichiometric exhaust gas mixture may be an exhaust gas mixture which contains no unburned fuel. In one example, maintaining the exhaust gas mixture near stoichiometry may include adjusting the throttle to increase mass air flow and subsequently increase a combustion air-fuel ratio. In this way, the controller may maintain a stoichiometric air-fuel ratio. An example method for maintaining stoichiometry is presented below at FIGS. 3-4.

Further, the exhaust passage 48 may include a wastegate 126 for diverting exhaust gas away from the turbine 176. For example, increasing the opening of the wastegate 126 may decrease the amount of exhaust gas flowing through the turbine. As such, opening the wastegate 126 may decrease boost, thereby decreasing torque output of the engine. Exhaust passage 148 further includes an emission control device 178. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from fuel system 172. An example embodiment of fuel system 172 is illustrated in FIG. 2. Fuel system 172 includes fuel storage tank 202. Fuel may be pumped from fuel storage tank 202, through fuel delivery pipe 206, to fuel rail 208 via fuel pump 204. Fuel rail 208 may disperse fuel to one more fuel injectors 166 according to the pulse width of signal FPW from controller 12 to be injected into the ports of cylinder(s) 14. The pulse width of signal FPW may correspond to an amount of fuel injected by the fuel injectors 166. Fuel tank 202 includes filling tube 210 for receiving fuel. Fuel filling tube 210 may be configured to extend away from fuel tank 202 to the external edge of the body of the vehicle so that it is accessible by a vehicle operator to fill the fuel tank. Fuel filling tube 210 may be fitted with a fuel cap 212 which may be removed during fuel tank filling.

Fuel cap 212 may be configured to create a vapor-tight seal when connected to fuel filling tube 210 such that fuel vapor may be prevented from escaping from the fuel filling tube and the fuel tank. Fuel cap sensor 214 may be positioned in a sidewall of fuel filling tube 210. Fuel cap sensor 214 may send signals to controller 12 indicating that fuel cap 212 has been removed or that the fuel cap is in an orientation that seals fuel filling tube 210.

In some embodiments, the fuel system may not include a removable fuel cap but rather may include a one way seal disposed in the end of the fuel filling tube. In such a configuration, a sensor may be included in the fuel system to detect when a fuel dispensing device enters the seal to dispense liquid fuel to the fuel tank. It should be appreciated that other suitable seal devices may be used to seal fuel filling tube.

The liquid fuel level in fuel tank 202 may be determined by controller 12 using sensor measurements. For example, in some embodiments, a liquid fuel level measuring device (not shown) that floats on the surface of the liquid fuel in the tank may determine the volume of liquid fuel in the tank. Further, in some embodiments, sensor 216 may measure fuel tank pressure (e.g., fuel pressure) and a liquid fuel level may be derived from that pressure measurement. It should be appreciated that an indication of the liquid fuel level may be provided to the driver based on a determination via measurement and/or calculation. Controller 12 may generate a fuel level reading that may range between a full fuel tank and an empty fuel tank based on the received measurements and/or the determination. The indication may be displayed to the vehicle operator via a fuel level indicator that may be used by the vehicle operator for fuel tank filling purposes.

Fuel system 172 further includes fuel vapor canister 220 that connects to fuel tank 202 via vent pipe 218. In order to regulate pressure in fuel tank 202, fuel vapor may flow from fuel tank 202 through vent pipe 218 to fuel vapor canister 220. Fuel vapor canister 220 may trap fuel vapor flowing into the canister while allowing air filtered through the canister to be vented to the atmosphere via an air vent (not shown). In some embodiments, the fuel vapor canister may filter fuel vapor with charcoal. The fuel vapor may adhere to the charcoal until the fuel vapor is purged.

Fuel vapor canister saturation may occur responsive to various operating conditions and events. In one example, fuel tank filling may force fuel vapor residing in the fuel tank into the canister causing canister saturation. As another example, heat and/or pressure generated during vehicle operation may cause liquid fuel to evaporate creating fuel vapor which may be transferred into the canister causing saturation.

In order to avoid over saturation of the fuel vapor canister and release of fuel vapor to the atmosphere, fuel vapor may be purged from fuel vapor canister 220 through control of purge valve 222. Fuel vapor may be purged from the fuel vapor canister using engine vacuum created during engine operation. In one example, engine vacuum may be created by actuating throttle 164 and, upon actuation of purge valve 222, fuel vapor may travel from fuel vapor canister 220 into the intake manifold and enter cylinder(s) 14 for combustion. By introducing fuel vapor into the cylinder and not into the atmosphere fuel economy may be improved. However, under some conditions, fuel vapor purging may increase the amount of fuel entering the cylinders 14 for combustion, thereby decreasing the air-fuel ratio (e.g., combustion air-fuel ratio). This may result in a decrease in the fuel injector pulse width and subsequently the amount of fuel injected into the cylinders 14. When the fuel injector pulse width decreases to a minimum or threshold pulse width such that the pulse width may no longer be reduced, the air-fuel ratio of the exhaust gas may become rich during fuel vapor purging. As a result, exhaust aftertreatment efficiency may decrease and exhaust emissions may increase. Fuel vapor purging may result in operation of the fuel injectors 166 at the threshold pulse width, especially under conditions of low mass air flow. Methods for operating the engine and increasing the air-fuel ratio under this threshold pulse width condition are presented at FIG. 3.

It should be appreciated that other fuel vapor venting and purging configurations may be implemented in the fuel system discussed above. For example, additional vent pipes and/or canisters may be used to filter and contain fuel vapor. As another example, a fuel vapor purging system may include multiple purge valves.

Returning to FIG. 1, in some embodiments, engine 10 may have an alternative or additional fuel injector, positioned in the intake passage, such as fuel injector 170. Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172. In one example, engine 10 may use both DI and PFI. In another example, engine 10 may use only one of DI and PFI.

As described above, FIG. 1 shows only one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; fuel pressure from sensor 216; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Furthermore, controller 12 may communicate with various actuators, which may include engine actuators such as fuel injectors, an electronically controlled intake air throttle plate, spark plugs, camshafts, etc. Various engine actuators may be controlled to provide or maintain torque demand as specified by the vehicle operator 130. These actuators may adjust certain engine control parameters including: variable cam timing (VCT), the air-fuel ratio, alternator loading, spark timing, throttle position, variable valve timing (VVT), variable lift timing (VLT), wastegate position, etc.

Storage medium read-only memory 110 can be programmed with computer readable data representing instructions executable by processor 106 for performing the methods described below as well as other variants that are anticipated but not specifically listed. An example routine that may be performed by the controller is described at FIG. 2.

The system of FIGS. 1-2 provides for an engine system including an intake manifold, an engine cylinder, and an intake throttle positioned upstream of the intake manifold. The engine system further includes a fuel system having a fuel injector for injecting fuel into the engine cylinder. Finally, the engine system includes a controller with computer readable instructions for adjusting a position of the intake throttle to increase engine airflow while maintaining engine torque, in response to operation of the fuel injector at a threshold fuel pulse width. In one example, maintaining engine torque includes one or more of retarding spark ignition timing, adjusting a variable valve timing and/or lift, adjusting a variable camshaft timing, increasing an alternator load applied on the engine, and adjusting a position of a wastegate or other valve in the exhaust. Adjusting the position of the intake throttle to increase engine airflow may include increasing engine airflow from a first level based on torque demand to a second, higher, level to maintain an exhaust gas mixture near stoichiometry.

Figure 3:
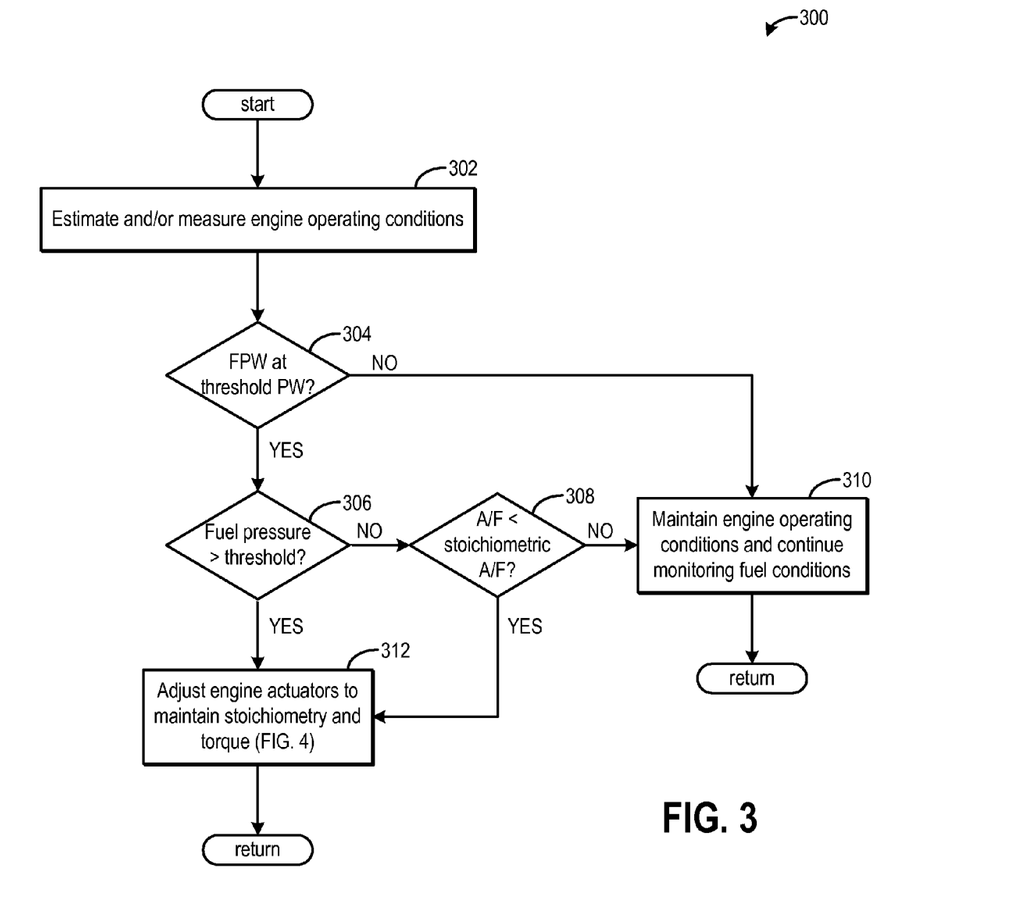
FIG. 3 shows a method for adjusting engine airflow based on fuel injector operation.
Figure 4:
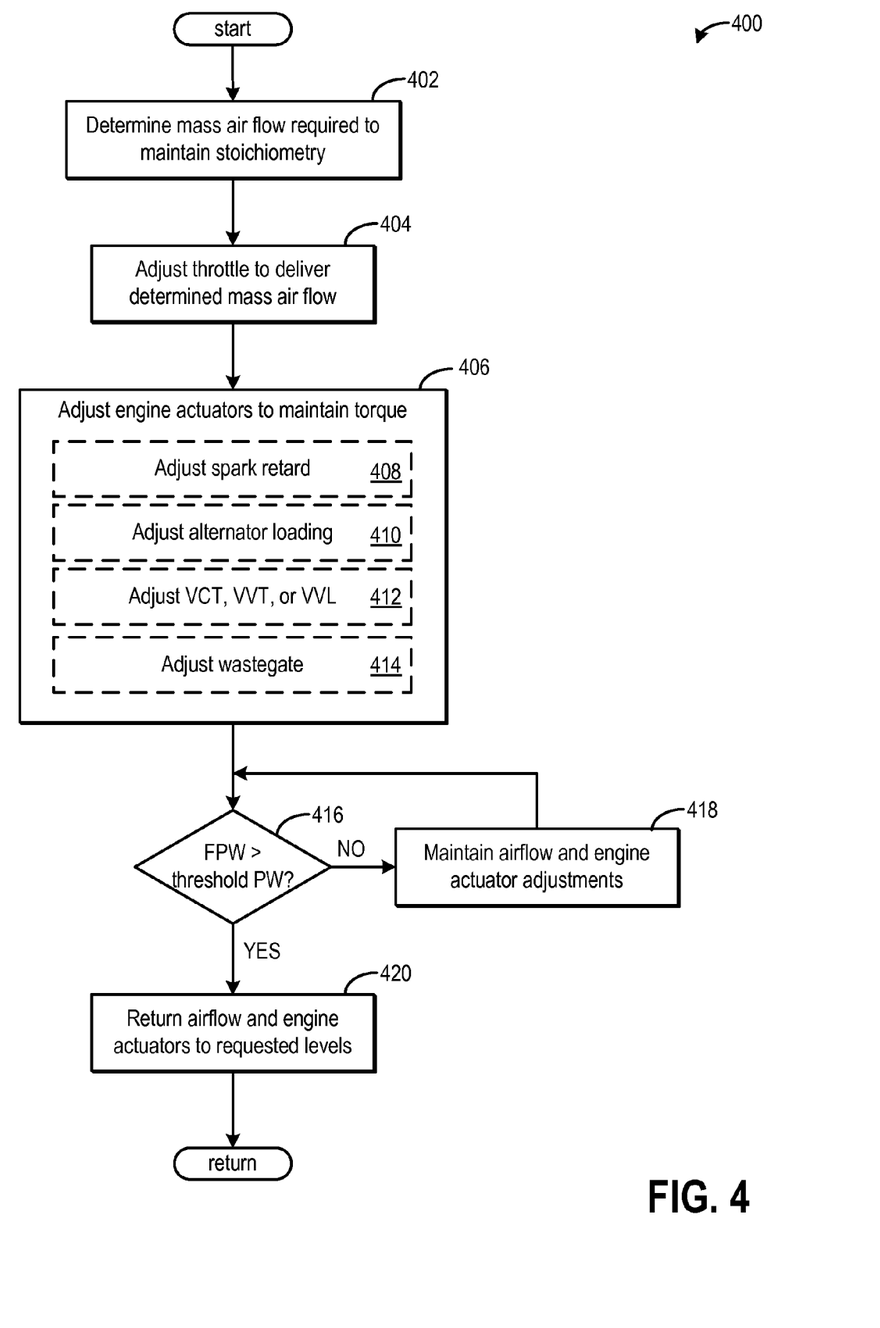
FIG. 4 shows a method for adjusting engine actuators to maintain engine torque while increasing engine airflow during operation of a fuel injector at a threshold pulse width.
Figure 5:
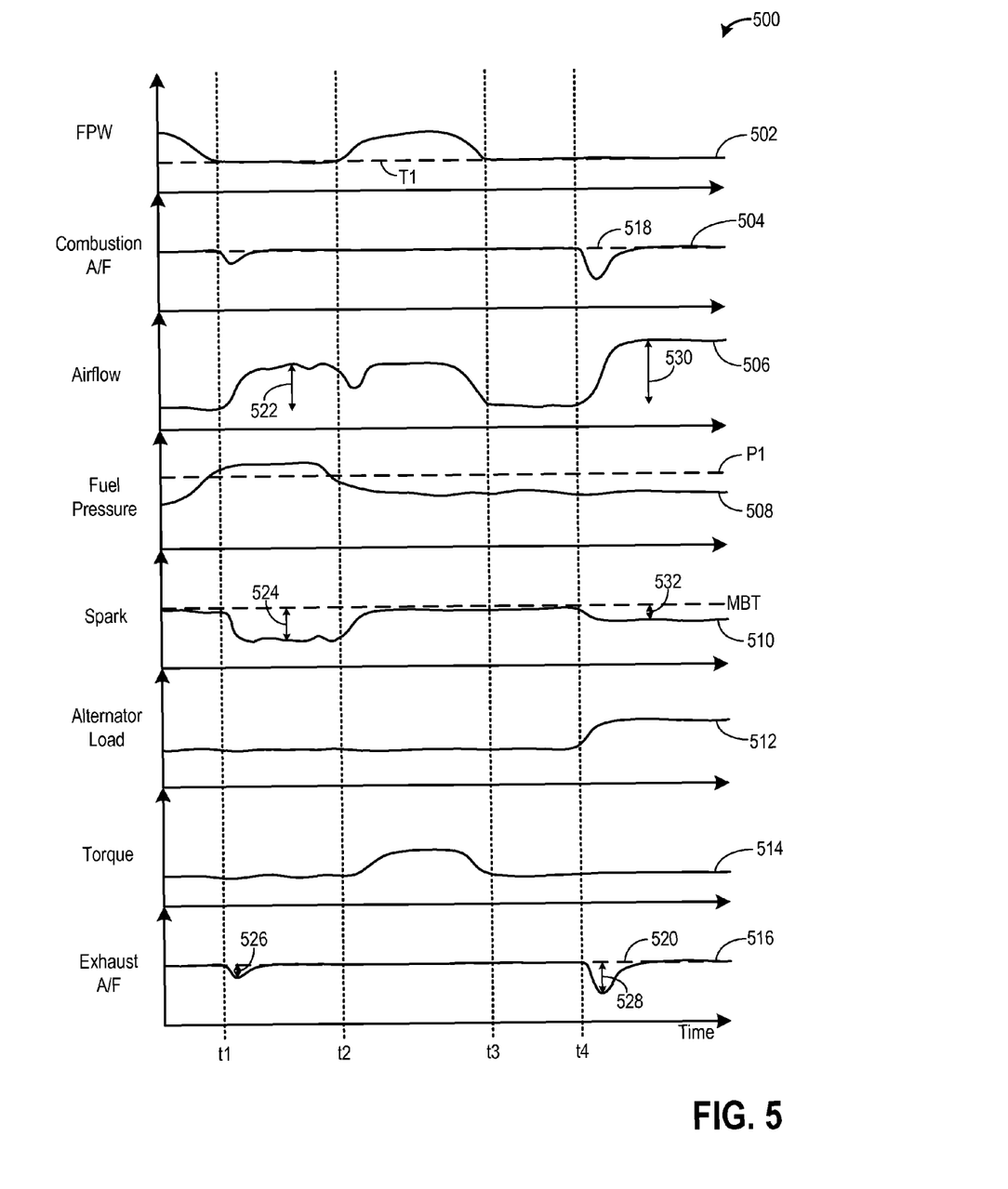
FIG. 5 shows a graphical example of adjusting engine actuators responsive to a fuel injector pulse width and exhaust gas air-fuel ratio.

As elaborated with reference to FIGS. 3-5, the controller may adjust one or more engine actuators to maintain a stoichiometric air-fuel ratio while also maintaining engine torque. These engine actuator adjustments may be required when the fuel injectors are operating at a threshold pulse width. The controller may send a fuel pulse width signal (FPW) to the fuel injectors. The pulse width may correspond to an amount of fuel injected into the engine cylinders for combustion. The threshold pulse width may be a minimum pulse width such that the fuel injection pulse width cannot be further reduced. As such, if the fuel injectors are operating at the threshold pulse width, the amount of fuel injected into the cylinders for combustion may not be further reduced.

Various engine operating conditions may result in operation of the fuel injectors at the threshold pulse width. As engine torque demand decreases, less fuel and engine airflow are required for combustion. As engine airflow, or mass air flow, decreases, the amount of fuel injected may also decrease to maintain a stoichiometric air-fuel ratio. Thus, the controller may reduce the pulse width of the signal sent to the fuel injectors so less fuel is injected into the engine cylinders. Eventually, the FPW signal may reach the threshold pulse width.

Under certain conditions, operation at the threshold pulse width may result in a rich air-fuel ratio. In one example, high fuel pressure may result in more fuel being injected at a set pulse width. For example, after a hot soak and restart, fuel pressure may be high as a result of the temperature rise and thermal expansion of fuel in the rail. When the fuel pressure is greater than a threshold pressure, a larger amount of fuel may be injected at the threshold pulse width than when the fuel pressure is less than the threshold pressure. Injecting a larger amount of fuel in this way may decrease the combustion air-fuel ratio and result in a non-stoichiometric exhaust gas mixture (e.g., some unburned fuel in exhaust gas). The air-fuel ratio may further decrease under high fuel pressure conditions when engine airflow is low (e.g., during low torque demand).

In another example, after purging fuel vapor from the fuel vapor canister, the amount of fuel in the engine cylinders may increase, thereby decreasing the air-fuel ratio. If the fuel injectors are operating at the threshold pulse width during fuel vapor purging, the combustion air-fuel ratio may be rich. The air-fuel ratio may decrease further when purging fuel vapor during low engine airflow conditions. Combusting a rich air-fuel ratio may decrease exhaust aftertreatment efficiency and increase exhaust emissions. Thus, the controller may adjust engine airflow to reduce enrichment during the above conditions.

During normal engine operation, engine airflow may be controlled in response to a torque demand. Torque demand may be based on a pedal position, as requested by the vehicle operator. Thus, as pedal position, and subsequently torque demand, increases, engine airflow may increase to deliver the requested torque. As discussed above, increasing engine airflow may include increasing the opening of the throttle. As such, the throttle may be controlled to deliver the required airflow for a requested torque demand.

During operation at the threshold pulse width, the controller may control airflow in response to an exhaust air-fuel ratio, rather than in response to torque demand. Specifically, in one example, during fuel injector operation at the threshold pulse width, the controller may increase engine airflow, or mass air flow, to maintain a stoichiometric exhaust air-fuel ratio (e.g., maintain stoichiometry). For example, in response to operating the fuel injectors at the threshold pulse width, when a fuel pressure is greater than a threshold pressure and/or the exhaust air-fuel ratio is less than a stoichiometric air-fuel ratio, the controller may increase engine airflow. In one example, increasing engine airflow may include increasing the opening of a throttle to increase mass air flow to the intake manifold. The controller may increase engine airflow based on an air-fuel ratio of an exhaust gas. For example, the controller may adjust the throttle to deliver an amount of air for combustion that may result in a stoichiometric air-fuel ratio of the exhaust gases exiting the cylinders after combustion.

Increasing engine airflow to maintain stoichiometry may result in increasing airflow to a level greater than required for a current torque demand. Thus, the resulting engine torque output may be greater than requested by the vehicle operator. To compensate for increased torque due to increased airflow, the controller may adjust additional engine actuators to reduce torque. For example, during the increasing engine airflow while operating the fuel injectors at the threshold pulse width, the controller may simultaneously adjust engine actuators to maintain torque output at a demanded level. Engine actuator adjustments to maintain a desired torque output may include adjusting spark timing and/or adjusting alternator loading. Engine actuator adjustments may further include adjusting the pumping work of the engine by adjusting VVT, VCT, VVL, a wastegate, and/or an exhaust throttle. For example, by retarding spark timing in relation to MBT, torque may be decreased to compensate for the increase in airflow during the operation of the fuel injectors at the threshold pulse width. In another example, retarding or advancing VCT, VVT, and/or VVL may increase the pumping work of the engine, thereby decreasing torque. In some embodiments, increasing pumping work of the engine by adjusting a wastegate or exhaust throttle may reduce power output at the larger intake throttle opening, thereby helping to maintain torque demand. Further still, increasing alternator loading may provide torque compensation. Vehicles with electric machines (e.g., hybrid vehicles) may be able to increase alternator loading to a greater degree as they may have a larger operating range.

In one embodiment, only one of the above engine operating actuators may be adjusted at one time to offset the airflow increase and maintain torque. For example, the controller may increase spark retard to maintain torque during the increasing engine airflow. In another embodiment, a combination of the above parameters may be adjusted to maintain the requested torque. For example, the controller may reduce spark timing while also increasing alternator load to compensate for increased airflow. As such, less spark retard may be required to maintain torque when also adjusting another actuator such as alternator loading. The choice of engine actuator adjustment to maintain torque may be based the adjustment's effect on combustion stability. For example, retarding spark may reduce combustion stability by a greater degree than increasing alternator loading. Thus, alternator loading may be adjusted first or in combination with adjusting spark timing in order to increase combustion stability while maintaining torque output. Further details on engine actuator adjustments to maintain torque are presented below with reference to FIGS. 4-5.

In this way, during operation of a fuel injector at a threshold pulse width, engine airflow may be increased to maintain an exhaust gas mixture near stoichiometry while also adjusting an engine actuator to maintain torque. In one example, the threshold pulse width may be a minimum pulse width. Increasing the engine airflow may include increasing an opening of an intake throttle. In one example, an amount of increase in engine airflow may be based on an air-fuel ratio of the exhaust gas mixture. Further, the increasing engine airflow may be responsive to one or more of a fuel pressure greater than a threshold pressure and a rich exhaust gas mixture during the operating of the fuel injector at the threshold pulse width. In one example, the threshold pressure is based on a fuel pressure which increases an amount of fuel injected into an engine cylinder to a level resulting in a rich exhaust gas mixture. Adjusting an engine actuator to maintain torque may include adjusting one or more of a spark timing, a variable valve timing, a variable cam timing, a variable valve lift, an opening of a wastegate, and an alternator loading. After operating the fuel injector at the threshold pulse width, engine airflow may be returned to a requested level in response to operation of the fuel injector at a pulse width greater than the threshold pulse width. Further details on airflow and engine actuator adjustments based on fuel injector operation are presented below with reference to FIGS. 3-5.

FIG. 3 shows a method 300 for adjusting engine airflow based on fuel injector operation. The method begins at 302 by estimating and/or measuring engine operating conditions. Engine operating conditions may include engine speed and load, torque demand, combustion air-fuel ratio, exhaust gas air-fuel ratio, fuel pressure, fuel injection pulse width, engine airflow (e.g., mass air flow), spark timing, VVT, VCT, VVL, wastegate position, throttle position, alternator loading, etc. At 304, the method includes determining if the fuel pulse width signal, FPW, is at the threshold pulse width (PW). A length of the pulse width signal may correspond to an amount of fuel injected into the engine cylinders for combustion, with the amount of fuel injected decreasing with decreasing pulse width. As discussed above, the threshold pulse width may be the smallest pulse width signal sent to the fuel injectors. As such, when operation of the fuel injectors is at the threshold pulse width, the amount of fuel injected may not be further decreased. If the FPW is not at the threshold pulse width (e.g., greater than the threshold pulse width), the method continues on to 310 where the controller maintains engine operating conditions and continues to monitor the fuel system conditions. However, if the FPW is at the threshold pulse width, the method continues on to 306.

At 306, the method includes determining if the fuel pressure is at or greater than a threshold pressure. The threshold pressure may be based on a standard fuel injection amount at the threshold pulse width. For example, at the threshold pulse width, a first amount of fuel may be injected into an engine cylinder. As fuel pressure increases, the first amount of fuel may increase. The threshold pressure may be defined as the pressure at which the first amount of fuel increases by a threshold amount. The threshold amount may be an amount of fuel which results in a rich air-fuel ratio. Thus, operation of the fuel injectors at the threshold pulse width at or above the threshold fuel pressure may result in combusting a rich air-fuel ratio, thereby increasing engine exhaust emissions. If, at 306, the fuel pressure is at or greater than the threshold pressure, the method continues on to 312. At 312, the controller may increase engine airflow to maintain stoichiometry while adjusting engine actuators to maintain torque output. In one example, this may include increasing the opening of the intake throttle while retarding spark timing to maintain torque, thereby compensating for the increased airflow. A method for adjusting airflow and maintaining torque in this way is presented at FIG. 4.

Returning to 306, if the fuel pressure is not greater than the threshold pressure, the method continues on to 308 to determine if an air-fuel ratio of the exhaust gas (e.g., exhaust gas mixture) is less than a stoichiometric air-fuel ratio (e.g., the air-fuel ratio is rich). The air-fuel ratio of the exhaust gas may be determined with an exhaust gas sensor, coupled to an exhaust passage. If the exhaust gas air-fuel ratio is rich, the method continues on to 312 to increase engine airflow to maintain stoichiometry while adjusting engine actuators to maintain torque (described further at FIG. 4). However, if the exhaust gas mixture is stoichiometric, the method continues on to 310 to maintain engine operating conditions. The controller may continue to monitor fuel conditions of the fuel system. In this way, if the exhaust air-fuel ratio decreases and/or the fuel pressure increases while operating the fuel injectors at the threshold pulse width, the controller may then adjust airflow and engine actuators as discussed further below.

FIG. 4 shows a method 400 for adjusting engine actuators to maintain engine torque while increasing engine airflow during operation of a fuel injector at a threshold pulse width. Continuing from method 300, method 400 begins at 402 by determining a mass air flow, or engine airflow, required to maintain stoichiometry. For example, an amount of increase in engine airflow may be based on the air-fuel ratio of the exhaust gas mixture. Thus, as the exhaust gas air-fuel ratio decreases further below the stoichiometric ratio, the mass air flow rate, or amount of increase in engine airflow, may increase. In this way, engine airflow may increase by an amount which maintains the exhaust gas air-fuel ratio at stoichiometry. After 402, the method then continues on to 404 to adjust the intake throttle to deliver the determined mass air flow or amount of engine airflow. Increasing engine airflow may include increasing the opening of the intake throttle. For example, for a larger determined mass air flow, the throttle may be opened by a larger amount.

At 406, the controller adjusts one or more engine actuators to maintain torque during the increase in mass air flow. The methods at 404 and 406 may occur concomitantly. By adjusting engine actuators while increasing engine airflow, a total torque may be reduced so that an actual torque demand can be maintained during the fuel injector operation at the threshold pulse width. Adjusting engine actuators to maintain torque may include adjusting spark retard at 408. In one example, increasing spark retard (that is, retarding spark further away from MBT) may decrease torque and help to maintain the requested torque demand. Adjusting actuators may also include adjusting the alternator loading at 410. For example, increasing the alternator load applied on the engine may decrease torque, compensating for increased engine airflow. An alternator load applied on the engine may be increased by adjusting an alternator coil current. Alternatively, at 412, adjusting actuators may include adjusting VCT, VVT, and/or VVL. For example, in some embodiments, retarding VCT may reduce torque, compensating for the increase in engine airflow. In yet another example, adjusting actuators may include adjusting the wastegate, or another exhaust throttle, at 414. Specifically, increasing the opening of the wastegate may divert exhaust flow around the turbine, thereby decreasing torque. Thus, as the opening of the intake throttle increases to increase engine airflow, the opening of the wastegate may also increase to help maintain torque. Alternatively, partially closing another exhaust throttle valve may increase exhaust backpressure, thus increasing engine pumping work and compensating for the increase in engine airflow.

In some embodiments, a combination of the above parameters may be adjusted to offset the airflow increase and maintain torque. In other embodiments, a priority hierarchy may be employed for these adjustment parameters based on their effect on combustion stability and/or fuel efficiency. For example, increasing alternator load may not increase combustion instability or degrade fuel efficiency to the same degree as VCT or spark adjustments might. Thus, the priority hierarchy at 406 may include adjusting alternator loading first and then (if further torque reduction is required) moving on to adjust spark timing and/or VCT. In some embodiments, a trigger may be set to move on to the next parameter in the hierarchy. For example, alternator loading may be initially used to reduce torque and once a maximum alternator load has been applied on the engine, the trigger may be set so that the residual torque decrease is met using spark timing, VCT or other timing system adjustments. The order of priority may also be altered depending on engine operating conditions and other vehicle operating operations, such as a vehicle speed, a vehicle mode of operation, a battery state of charge, etc. Example actuator adjustments performed during increasing airflow due to fuel injector operation at the threshold pulse width are elaborated herein with reference to FIG. 5.

After making all engine actuator adjustments at 406, the method continues to 416 to determine if the FPW is greater than the threshold pulse width (PW). If the FPW is not greater than the threshold pulse width (e.g., FPW remains at the threshold pulse width), the method continues on to 418 to maintain the increased engine airflow and engine actuator adjustments. In some embodiments, engine airflow (e.g., throttle) and engine actuator adjustments to maintain torque may be continually adjusted based on the air-fuel ratio of the exhaust gas. For example, during the operation of the fuel injector at the threshold pulse width, if the air-fuel ratio of the exhaust gas increases or decreases above or below the stoichiometric ratio, the throttle opening may also change to maintain the air-fuel ratio at stoichiometry. Engine actuator adjustments may then be altered to maintain torque at the new engine airflow level.

Returning to 416, if the FPW is greater than the threshold pulse width (e.g., fuel injectors are no longer being operated at the threshold pulse width), the method continues on to 420 to return engine airflow to a requested level, based on engine operating conditions including torque demand. The engine actuators are also returned to requested levels in order to deliver torque as requested by the vehicle operator.

In this way, in response to operation of a fuel injector at a threshold pulse width, when an air-fuel ratio of an exhaust gas is less than a stoichiometric ratio, engine airflow may be increased greater than requested by a vehicle operator, without increasing engine torque by adjusting an engine actuator to maintain torque. The increasing engine airflow and adjusting the engine actuator may be further responsive to operation of the fuel injector at the threshold pulse width when a fuel pressure is greater than a threshold pressure. In one example, the increasing engine airflow includes increasing an opening of an intake throttle. Additionally, an amount of increase in engine airflow may increase with decreasing air-fuel ratio of the exhaust gas. The amount of increase in engine airflow may further increase with increasing fuel pressure. In one example, adjusting an engine actuator to maintain torque includes increasing an amount of spark retard, with the amount of spark retard increasing as the amount of increase in engine airflow increases. In another example, adjusting an engine actuator to maintain torque includes increasing an alternator load applied on the engine, with the alternator load increasing as the amount of increase in engine airflow increases. In yet another example, adjusting an engine actuator to maintain torque includes increasing an opening of a wastegate, with the opening of the wastegate increasing as the amount of increase in engine airflow increases. In an additional example, adjusting an engine actuator to maintain torque includes retarding variable cam timing. In another example, adjusting an engine actuator to maintain torque may include increasing an alternator load applied on the engine while adjusting one or more of spark retard, variable cam timing, variable valve timing, variable valve lift, and an opening of a wastegate.

FIG. 5 shows a graphical example of engine actuator adjustments responsive to a fuel injector pulse width. Specifically, graph 500 shows changes in a fuel pulse width signal (FPW) at plot 502, changes in a combustion air-fuel ratio at plot 504, changes in engine airflow at plot 506, changes in fuel pressure at plot 508, changes in spark timing at plot 510, changes in alternator loading at plot 512, changes in torque at plot 514, and changes in an exhaust air-fuel ratio at plot 516.

Before time t1, the FPW may be above a threshold pulse width, T1 (plot 502). Fuel pressure is below a threshold pressure, P1 (plot 508), and the exhaust air-fuel ratio is at a stoichiometric ratio 520 (plot 516). Just before time t1, the fuel pressure increases above the threshold pressure P1. At time t1, the FPW decreases to the threshold pulse width T1 (plot 502). As a result, the air-fuel ratio of the exhaust gas decreases below the stoichiometric ratio 520. In response to operation of the fuel injectors at the threshold pulse width T1 when fuel pressure is above the threshold pressure P1 and the exhaust air-fuel ratio is rich, the controller increases engine airflow just after time t1. Increasing engine airflow may include increasing the opening of an intake throttle. As engine airflow increases (plot 506), the combustion air-fuel ratio (plot 504) and the exhaust air-fuel ratio (plot 516) increase. A first amount of increase in engine airflow 522 may allow the exhaust air-fuel ratio to be maintained at stoichiometry (plot 516). Along with increasing engine airflow at time t1, the controller retards spark (plot 510) to compensate for the increase in airflow and maintain torque at a requested level (plot 514). As such, a first amount of spark retard 524 may be based on the first amount of increase in engine airflow 522.

Just before time t2, fuel pressure decreases below the threshold pressure P1 (plot 508). At time t2, the FPW increases above the threshold pulse width T1 (plot 502). Thus, the fuel injectors are no longer being operated at the threshold pulse width, T1. As a result, the controller returns engine airflow to a currently requested level and increases spark timing towards MBT (plot 510).

At time t3, the fuel injectors are operated at the threshold pulse width T1, as indicated as a decrease in the FPW to the threshold pulse width T1 (plot 502). However, at time t3, the fuel pressure remains below the threshold pressure P1 and the exhaust air-fuel ratio remains near the stoichiometric ratio 516. Thus, engine operating conditions are maintained while the controller continues to monitor fuel conditions. At time t4, the exhaust air-fuel ratio becomes rich, decreasing below the stoichiometric ratio 520 (plot 516). This may occur due to increased fuel in the combustion cylinders after fuel vapor purging (indicated by a decrease in the combustion air-fuel ratio (plot 504)). In response to a rich exhaust air-fuel ratio while operating the fuel injectors at the threshold pulse width T1, the controller increasing the opening of the intake throttle to increase engine airflow by a second amount of increase in engine airflow 530. The second amount of increase in engine airflow 530 may be larger than the first amount of increase in engine airflow 522 at time t2. This may be due to the decrease in the exhaust air-fuel ratio at time t4 (shown at 528) being greater than the decrease in the exhaust air-fuel ratio at time t1 (shown at 526).

Further, at time t4, the controller may increase both alternator loading (plot 512) and spark retard (plot 510) to maintain torque while increasing engine airflow. Since the controller increases alternator loading, along with spark retard, a second amount of spark retard 532 may be lower than if spark retard was increased alone to maintain torque. In this way, increasing alternator loading may allow for less spark retard, thereby increasing combustion stability. In alternate embodiments, the controller may adjust additional or alternative engine actuators at time t4. As described above, these may include adjusting VCT, VVT, VVL, and/or an opening of a wastegate. For example, at time t4, the controller may instead increase the opening of the wastegate by an amount corresponding to the second amount of increase in engine airflow 530. If the opening of the wastegate may not be further increased, an additional actuator may be adjusted.

As shown at time t4, in response to operation of a fuel injector at a threshold pulse width, when an air-fuel ratio of an exhaust gas is less than a stoichiometric ratio, a controller may increase engine airflow greater than requested by a vehicle operator, without increasing engine torque by adjusting an engine actuator to maintain torque. The increase in engine airflow is based on the exhaust gas air-fuel ratio. The engine airflow is adjusted, by adjusting a throttle, such that the exhaust gas is maintained at stoichiometry. Engine actuators are then adjusted to maintain torque at a requested level during the increase in engine airflow. As shown at time t4, more than one engine actuator may be adjusted to maintain torque. In the example shown at time t4, both alternator loading and spark retard are increased in order to compensate for the airflow increase and maintain torque.

As shown at time t1, increasing engine airflow and adjusting one or more engine actuators may be responsive to operation of the fuel injector at the threshold pulse width when a fuel pressure is greater than a threshold pressure. The controller again increases engine airflow by an amount that maintains a stoichiometric exhaust gas mixture. Spark timing is retarded to decrease torque output at the increased mass air flow, thereby maintaining torque at a requested level. As such, the amount of spark retard may be based on the amount of increase in engine airflow. Though the example at time t1 shows adjusting spark timing, additional or alternative engine actuator adjustments may be used to maintain torque, as discussed above.

In this way, during operation of a fuel injector at a threshold pulse width, engine airflow may be increased to maintain an exhaust gas mixture near stoichiometry. Increasing engine airflow may be responsive to a fuel pressure greater than a threshold pressure and/or and exhaust gas air-fuel ratio below a stoichiometric ratio, when the fuel injectors are operating at the threshold pulse width. During the increasing engine airflow, one or more engine actuators may be simultaneously adjusted to maintain engine output torque at a requested level. Engine actuator adjustments to maintain torque may include increasing spark retard, increasing alternator loading, retarding VCT, adjusting VVT, adjusting VVL, and/or increasing the opening of a wastegate. In this way, engine exhaust may be reduced while maintaining engine performance.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An engine method, comprising:
during operation of a fuel injector at a threshold pulse width, increasing engine airflow to maintain an exhaust as mixture stoichiometric air-fuel ratio while adjusting an engine actuator to maintain torque; and
increasing engine airflow responsive to a fuel pressure greater than a threshold pressure during the operation of the fuel injector at the threshold pulse width.

2. The method of claim 1, wherein the threshold pulse width is a minimum pulse width and wherein increasing the engine airflow includes increasing an opening of an intake throttle.

3. The method of claim 1, wherein an amount of increase in engine airflow is based on an air-fuel ratio of the exhaust gas mixture.

4. The method of claim 1, further comprising, increasing engine airflow responsive to a rich exhaust gas mixture during the operation of the fuel injector at the threshold pulse width.

5. The method of claim 4, wherein the threshold pressure is based on a fuel pressure which increases an amount of fuel injected into an engine cylinder to a level resulting in a rich exhaust gas mixture.

6. The method of claim 1, wherein adjusting an engine actuator includes adjusting one or more of a spark timing, a variable valve timing, a variable cam timing, a variable valve lift, an opening of a wastegate, an opening of an exhaust throttle, and an alternator loading.

7. The method of claim 1, further comprising returning engine airflow to a requested level in response to operation of the fuel injector at a pulse width greater than the threshold pulse width.

8. An engine method, comprising:
in response to operation of a fuel injector at a threshold pulse width, when an air-fuel ratio of an exhaust gas is less than a stoichiometric ratio, increasing engine airflow by an amount based on the air-fuel ratio of the exhaust gas and greater than requested by a vehicle operator, without increasing engine torque by adjusting an engine actuator to maintain torque responsive to operation of the fuel injector at the threshold pulse width when a fuel pressure is greater than a threshold pressure, the amount of increase in engine airflow further increasing with increasing fuel pressure.

9. The method of claim 8, wherein the increasing engine airflow includes increasing an opening of an intake throttle and wherein the amount of increase in engine airflow increases with decreasing air-fuel ratio of the exhaust gas.

10. The method of claim 9, wherein adjusting an engine actuator to maintain torque includes increasing an amount of spark retard and wherein the amount of spark retard increases as the amount of increase in engine airflow increases.

11. The method of claim 9, wherein adjusting an engine actuator to maintain torque includes increasing an alternator load applied on an engine and wherein the alternator load increases as the amount of increase in engine airflow increases.

12. The method of claim 9, wherein adjusting an engine actuator to maintain torque includes increasing an opening of a wastegate and wherein the opening of the wastegate increases as the amount of increase in engine airflow increases.

13. The method of claim 9, wherein adjusting an engine actuator to maintain torque includes retarding variable cam timing.

14. The method of claim 8, wherein adjusting an engine actuator to maintain torque includes increasing an alternator load applied on an engine while adjusting one or more of spark retard, variable cam timing, variable valve timing, variable valve lift, an opening of an exhaust throttle, and an opening of a wastegate.

15. The method of claim 8, wherein the air-fuel ratio of the exhaust gas is determined with an exhaust gas sensor, coupled to an exhaust passage.

16. An engine system, comprising:
an engine including an intake manifold and an engine cylinder;
an intake throttle positioned upstream of the intake manifold;
a fuel system having a fuel injector for injecting fuel into the engine cylinder; and
a controller with computer readable instructions for adjusting a position of the intake throttle to increase engine airflow while maintaining engine torque, in response to operation of the fuel injector at a threshold fuel pulse width when a fuel pressure is greater than a threshold pressure, an amount of increase in engine airflow further increasing with increasing fuel pressure.

17. The system of claim 16, wherein maintaining engine torque includes one or more of retarding spark ignition timing, adjusting a variable valve timing, adjusting a variable camshaft timing, increasing an alternator load applied on the engine, adjusting an opening of an exhaust throttle, and adjusting a position of a wastegate.

18. The system of claim 16, wherein adjusting the position of the intake throttle to increase engine airflow includes increasing engine airflow from a first level based on torque demand to a second, higher level to maintain an exhaust as mixture stoichiometric air-fuel ratio.

* * * * *

UNITED STATES PATENT AND TRADEMARK OFFICE
CERTIFICATE OF CORRECTION

PATENT NO. : 9,316,172 B2
APPLICATION NO. : 13/857895
DATED : April 19, 2016
INVENTOR(S) : Thomas G. Leone et al.

It is certified that error appears in the above-identified patent and that said Letters Patent is hereby corrected as shown below:

In the claims,

Column 14, line 36, replace "as" with "gas".

Column 16, line 30, replace "as" with "gas".

Signed and Sealed this
Fifth Day of July, 2016

Michelle K. Lee
*Director of the United States Patent and Trademark Office*